(12) United States Patent
Nancke-Krogh (10) Patent No.: US 9,229,625 B2
(45) Date of Patent: Jan. 5, 2016

(54) SYSTEM AND METHOD FOR PROVIDING A CIRCULAR COMPUTER DESKTOP ENVIRONMENT

(71) Applicant: MOSAIQQ, Inc., San Francisco, CA (US)

(72) Inventor: Anders Nancke-Krogh, San Francisco, CA (US)

(73) Assignee: Mosaiqq, Inc, San Francisco, CA (US)

( * ) Notice: Subject to any disclaimer, the term of this patent is extended or adjusted under 35 U.S.C. 154(b) by 258 days.

(21) Appl. No.: 13/759,961

(22) Filed: Feb. 5, 2013

(65) Prior Publication Data

US 2013/0205237 A1 Aug. 8, 2013

Related U.S. Application Data

(60) Provisional application No. 61/595,220, filed on Feb. 6, 2012.

(51) Int. Cl.
*G06F 3/0481* (2013.01)
*G06F 3/0484* (2013.01)
(Continued)

(52) U.S. Cl.
CPC .......... *G06F 3/04842* (2013.01); *G06F 3/0481* (2013.01); *G06F 3/0484* (2013.01); *G06F 3/14* (2013.01); *G06F 3/1423* (2013.01);
(Continued)

(58) Field of Classification Search
CPC ..................................................... G06F 3/0481
USPC ........................................................ 715/765
See application file for complete search history.

(56) References Cited

U.S. PATENT DOCUMENTS

| 5,790,183 A | * | 8/1998 | Kerbyson | ........... G08B 13/1963 174/86 |
| 5,808,663 A | * | 9/1998 | Okaya | ..................... H04N 7/142 348/14.1 |
| 5,923,307 A | * | 7/1999 | Hogle, IV | ......................... 345/4 |

(Continued)

FOREIGN PATENT DOCUMENTS

| CN | 202422453 U | * | 9/2012 | |
| GB | 2470462 A | * | 11/2010 | .............. G06F 3/011 |

OTHER PUBLICATIONS

IBM Technical Disclosure Bulletin, "Edgeless Desktop", published Jan. 1, 1993, vol. 36, issue 1, pp. 11-12.*
(Continued)

*Primary Examiner* — Reza Nabi
*Assistant Examiner* — Daniel Rodriguez
(74) *Attorney, Agent, or Firm* — Louis Wu (57) ABSTRACT

Systems and methods for providing a circular computer desktop. In accordance with an embodiment, one or more computer monitors are used with a closed-path configuration, in which there are no, e.g., natural left and right desktop boundaries. When an object is moved or resized such that a portion or all of the object moves outside an expected boundary of the desktop, then that portion of the object is rendered and made visible at the opposite side of the desktop. The effect is one of a continuous or circular desktop. In accordance with an embodiment, the system can determine the position of objects within the desktop, taking into account the width of monitor bezels. In accordance with various embodiments, the system can be used with a single, e.g., flat or circular monitor, or with a plurality of monitors, and can accommodate left-right and/or up-down circular desktop behavior.

16 Claims, 12 Drawing Sheets

(51) Int. Cl.
*G06F 3/14* (2006.01)
*G09G 5/14* (2006.01)

(52) U.S. Cl.
CPC ............... *G06F3/1446* (2013.01); *G09G 5/14* (2013.01); *G09G 2340/0464* (2013.01); *G09G 2356/00* (2013.01)

(56) References Cited

U.S. PATENT DOCUMENTS

| | | | |
|---|---|---|---|
| 6,476,823 B1* | 11/2002 | Gardner | G06F 3/0481 345/418 |
| 6,680,714 B2 | 1/2004 | Wilmore | |
| 7,519,910 B2 | 4/2009 | Saka | |
| 2002/0135739 A1* | 9/2002 | Standard | E04H 3/22 353/46 |
| 2003/0015632 A1 | 1/2003 | Dunn et al. | |
| 2006/0284785 A1 | 12/2006 | Bitterlich | |
| 2008/0079800 A1* | 4/2008 | Kobayashi et al. | 348/14.09 |
| 2008/0148184 A1 | 6/2008 | Davis | |
| 2010/0118112 A1* | 5/2010 | Nimri | H04N 7/147 348/14.08 |
| 2010/0128423 A1* | 5/2010 | Moscovitch | F16M 11/04 361/679.01 |
| 2011/0047306 A1* | 2/2011 | Dickens | G06F 3/038 710/73 |
| 2011/0063191 A1 | 3/2011 | Leung et al. | |
| 2011/0134204 A1* | 6/2011 | Rodriguez | G06Q 10/10 348/14.03 |
| 2011/0164065 A1* | 7/2011 | Mate et al. | 345/676 |
| 2011/0292161 A1* | 12/2011 | Sharon | H04N 7/142 348/14.07 |
| 2013/0067396 A1 | 3/2013 | Demopoulos et al. | |
| 2013/0127748 A1* | 5/2013 | Vertegaal | A47G 19/2227 345/173 |
| 2013/0285921 A1* | 10/2013 | Alberth, Jr. | G06F 1/1652 345/173 |
| 2013/0285922 A1* | 10/2013 | Alberth, Jr. | G06F 1/1694 345/173 |

OTHER PUBLICATIONS

FVWM, "Fvwm 2.5.30 (from cvs)", Jun. 16, 2010, http://fvwm.org/documentation/manpages/unstable/fvwm.php.*

International Searching Authority, International Search Report and Written Opinion for PCT/US2013/024964, Jun. 15, 2013, 8 pages.

Unknown Author, Fvwm 2.6.0 Man Page. Instruction manual [online], Apr. 15, 2011, retrieved from the Internet: http://www.fvwm.org/documentation/manpages/unstable/fvwm.php.

Unknown Author, Wraparound for Mac. Software review [online], Dec. 29, 2011, retrieved from the Internet: http://web.archive.org/web/20111229133659/http://download.cnet.com/Wraparound/3000-18487_4_32085.html.

* cited by examiner

SYSTEM AND METHOD FOR PROVIDING A CIRCULAR COMPUTER DESKTOP ENVIRONMENT

CLAIM OF PRIORITY

This application claims the benefit of priority to U.S. Provisional Patent Application titled "SYSTEM AND METHOD FOR CIRCULAR COMPUTER DESKTOP ENVIRONMENT", Application No. 61/595,220, filed Feb. 6, 2012; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the present invention are generally related to computer systems, and user-computer interaction, and are particularly related to systems and methods for providing a circular computer desktop environment.

BACKGROUND

A computer desktop can be represented as a fixed rectangular area that is rendered or displayed on a computer monitor. In the event a larger desktop area is desired, additional monitors can be connected to the computer, and the real-estate of all the monitors combined to create the larger desktop.

The desktop is generally used to render the location and size of objects for display, examples of which displayable objects include windows, icons, and electronic documents. At a particular point in time, each object can be represented on the desktop according to its object properties, e.g., its vertical position, horizontal position, width, height, and z-order (which denotes a layer for the object, and is used to render one object atop another, e.g., to overlap one window upon another window).

In a computer setup that utilizes two or more computer monitors, the fixed rectangular desktop area displayed by the monitors is itself bounded by the perimeter or boundary surrounding the monitors. However, a typical system uses an open-path configuration in that, when an object is moved or resized such that a portion or all of the object moves outside the boundary of the desktop, that portion of the object will not be rendered, and will not be visible to the user. This is the general area that embodiments of the invention are intended to address.

SUMMARY

Described herein are systems and methods for providing a circular computer desktop. In accordance with an embodiment, one or more computer monitors are used with a closed-path configuration, in which there are no, e.g., natural left and right desktop boundaries. When an object is moved or resized such that a portion or all of the object moves outside an expected boundary of the desktop, then that portion of the object is rendered and made visible at the opposite side of the desktop. The effect is one of a continuous or circular desktop. In accordance with an embodiment, the system can determine the position of objects within the desktop, taking into account the width of monitor bezels. In accordance with various embodiments, the system can be used with a single, e.g., flat or circular monitor, or with a plurality of monitors, and can accommodate left-right and/or up-down circular desktop behavior.

DETAILED DESCRIPTION

As described above, a computer desktop can be represented as a fixed rectangular area that is rendered or displayed on a computer monitor. In the event a larger desktop area is desired, additional monitors can be connected to the computer, and the real-estate of all the monitors combined to create the larger desktop.

The desktop is generally used to render the location and size of objects for display, examples of which displayable objects include windows, icons, and electronic documents. In a computer setup that utilizes two or more computer monitors, the fixed rectangular desktop area displayed by the monitors is itself bounded by the perimeter or boundary surrounding the monitors. However, a typical system uses an open-path configuration in that, when an object is moved or resized such that a portion or all of the object moves outside the boundary of the desktop, that portion of the object will not be rendered, and will not be visible to the user.

In accordance with an embodiment, described herein are systems and methods for providing a circular computer desktop. In accordance with an embodiment, one or more computer monitors are used within a closed-path arrangement, in which there are no, e.g., natural left and right desktop boundaries. When an object is moved or resized such that a portion or all of the object moves outside an expected boundary of the desktop, then that portion of the object is rendered and made visible at the opposite side of the desktop. The effect is one of a continuous or circular desktop. In accordance with an embodiment, the system can determine the position of objects within the desktop, taking into account the width of monitor bezels. In accordance with various embodiments, the system can be used with a single, e.g., flat or circular monitor, or with a plurality of monitors, and can accommodate left-right and/or up-down circular desktop behavior.

Figure 1:
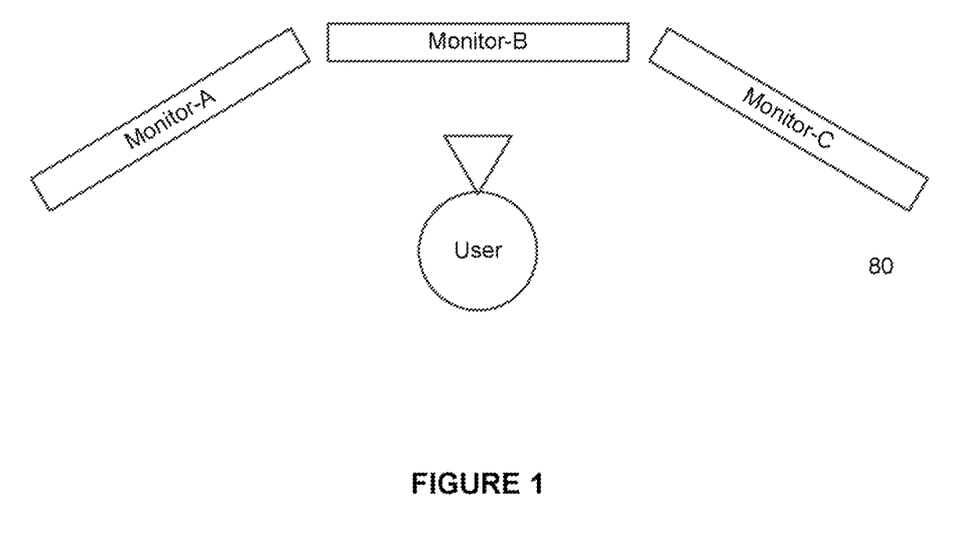
FIG. 1 illustrates a computer setup which utilizes three computer monitors in an open-path configuration.

FIG. 1 illustrates a computer setup 80 which utilizes three computer monitors in an open-path configuration, and illustrates how the real-estate of all the monitors can be combined to create a larger desktop area—in this example, the fixed rectangular desktop area displayed by the monitors and bounded by the perimeter boundary surrounding the monitors. As illustrated in FIG. 1, and in several of the figures that follow, the monitors are illustrated from an elevated perspective, to indicate their relative location with respect to one another.

With an open-path configuration, when an object is moved or resized such that a portion or all of the object moves outside the boundary of the desktop, that portion of the object will not be rendered, and will not be visible to the user. For example, in the setup illustrated in FIG. 1, the desktop has a natural boundary to the left of Monitor-A, and to the right of Monitor-C. Accordingly, with the open-path configuration, when the user moves or resizes an object beyond the left side of Monitor-A, or beyond the right side of Monitor-C, then the user will expect that portion of the object to be hidden (i.e., not rendered), since it is outside the boundary.

In accordance with an embodiment, the system can include a computer with one or more monitors that are instead used in a closed-path configuration, wherein the computer renders a rectangular two-dimensional (2D) desktop over the area of the connected monitors. In accordance with an embodiment, in a closed-path configuration, the monitors can be physically located with respect to one another so that they create a closed horizontal path, which can be a circular arrangement, but does not have to be. In accordance with an embodiment, the monitors can be mounted on the inside of the closed-path, e.g. if placed on separate walls within a room; or on the outside of the closed-path, e.g. if distributed on the surface of a column or other support structure, as illustrated in various examples below.

In accordance with an embodiment, by definition, the physical arrangement of the monitors does not have a natural left/right boundary. This means that objects placed on a virtual desktop as rendered by the computer onto the monitors are allowed to be located, moved, resized and layered freely along the entire area of the desktop in any direction, i.e., the effect can be one of a continuous or circular desktop. To accomplish this, the system must implement a wrapping method that renders different portions of the same object on the left and right side of the desktop, and must manage the layering of the object in the event the object width is larger than the combined virtual desktop width.

In accordance with an embodiment, the circular desktop can allow several users to rotate and move several individual objects simultaneously, including, in some embodiments, supporting collision control wherein a first user controlling an object can lose control of that object if a second user activates the object, as that activation grants right to control the objects position, layer and size.

In addition to supporting the circular desktop user-computer interaction features described herein, embodiments of the system can also incorporate or otherwise support use of additional user-computer interaction features, such as those described in U.S. patent application titled "SYSTEM AND METHOD FOR ENABLING A COLLABORATIVE DESKTOP ENVIRONMENT", application Ser. No. 13/213,025, filed Aug. 18, 2011, and published as U.S. Publication No. 20120054640; which application is herein incorporated by reference.

Figure 2:
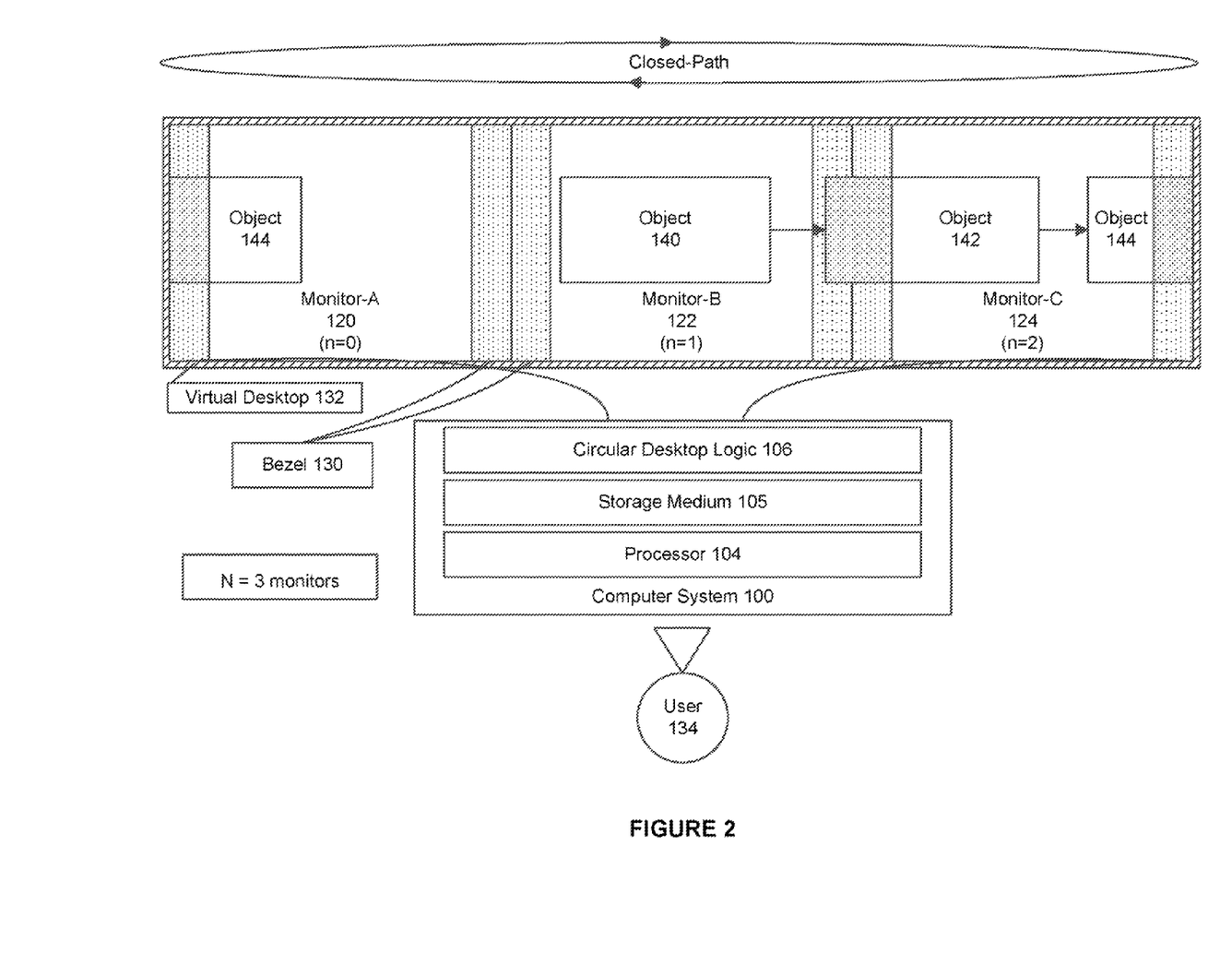
FIG. 2 illustrates a system for providing a circular computer desktop, in accordance with an embodiment.

FIG. 2 illustrates a system for providing a circular computer desktop, in accordance with an embodiment. As shown in FIG. 2, the system 100 can include a processor 104, storage medium 105, and circular desktop logic 106. In accordance with an embodiment, one or more monitors (in this example, three monitors, 120, 122, 124) can be mounted in a closed-path, within a plane along an axis, or distributed over a circular or other shape, such that a circular desktop 132 can account for bezels 130, but there is no natural left or right boundary for the desktop.

When there are no natural left or right boundaries associated with the physical layout of the monitors, then the users can place/move/resize objects freely around the available space or circular desktop covered by the monitors. For example, a user can move an object 140 to the left (144) starting at any position, and never reach a boundary for that movement. Similarly the user can move an object to the right (142), and never reach a boundary for that movement. Such a system is not possible to implement with today's desktop organized around a flat or curved open-path along the horizontal axis; therefore a new method for placement of the objects is required.

In accordance with an embodiment, the circular desktop is particularly useful in instances in which computer monitors are used to cover more than one side of a column, or when computer monitors are used to cover more than one wall in a room, as both cases will form a closed-path of monitors.

In accordance with an embodiment, if "N" monitors are numbered sequentially from left to right, then when an object located on monitor "n" is moved or resized so that the object's right side extends beyond the monitor's right border, then the object must continue to be rendered on the left side of monitor "n+1". If the object stretches across and beyond the right side of monitor "n+1", then the object must continue to render on the left side of monitor "n+2". Similarly if the object is being moved or resized outside the left border of monitor "n", then the object must continue to render on the right side of monitor "n−1", etc. In accordance with an embodiment, a physical monitor index number can be determined by performing a modulus math operation with N monitors. For example, in accordance with an embodiment, the modulus math operator can be defined as remainder=mod(number, divisor); wherein the divisor is N; the number is the theoretical monitor index number; and the remainder is the physical monitor index number. With this definition, in an example with three monitors (N=3), then an object displayed on monitor (n=0) that is resized or stretched to its left will appear on monitor mod(0-1, 3)=2. Similarly, in an example with a single monitor (N=1), then an object stretched outside the left border will appear on the right side of the same monitor.

When resizing an object it will eventually achieve an object width that is wider than the total width of the path of monitors defining the horizontal shape of the desktop. In accordance with an embodiment, when this happens, the object will be rendered in layers and is overlapping itself. There is no limit to the number of layers. The user can choose which of the layers shall be rendered as the top layer for this object. All layers of an object will stay together meaning if another object is placed on top, then this object is rendered on top of all of the layers of the lower object.

For example, in accordance with an embodiment, three monitors can be mounted in a triangle forming a closed horizontal path of a computer desktop. One or several users can be located throughout the path and they can move and resize several objects simultaneously. If a first user is moving an object to the left then he can continue the movement to the left forever, and will eventually get the object to the same position it was when the first user started the move. The first user can continue the move as much as the first user wants and the object will continue to move around the system from left to right until the first user stop moving the object. If a second user activates the object while the first user is controlling it, then the objects control is given to the second user and the first user will have to activate the object again to regain control of the position, size and z-index (layer position). This method for handling conflicts allows multiple users to work with multiple objects simultaneously on the same computer system.

In accordance with an embodiment, activation and control can be provided with touch, multi-touch, Kinect-style gestures, or with keyboard or mouse or other user input devices. If the computer system includes a physics engine with inertia and friction build into the graphical user interface then a user can make any object spin around in the path of the monitors where the object will leave the user at the same speed as the object had when controlled directly by the user, and then slowly the speed will go down with a system determined de-acceleration. This rotation and placement of objects can be done in any horizontal orientation. If an object is moved outside of the top or bottom of the desktop, the system controlling the user interface can choose to either delete the object or move it back slightly so that the users can regain control of it, subject to the design properties of that particular system.

As described above, the layout of monitors in today's computer systems is generally following an open-path; either a straight or curved line. As the hardware capabilities and input methods evolve, there will be a need for a computer system that organizes the monitors in a circular layout, such as with cylindrical monitors; or for use cases such as multi-user computer interfaces, where multiple users collaborate around the same computer system; or, e.g., the use of a circular system around a column or with a collection of monitors around several of the walls in a room or a collection of rooms will allow the users to organize the objects freely on the surface, much like in the real/physical world.

Figure 3:
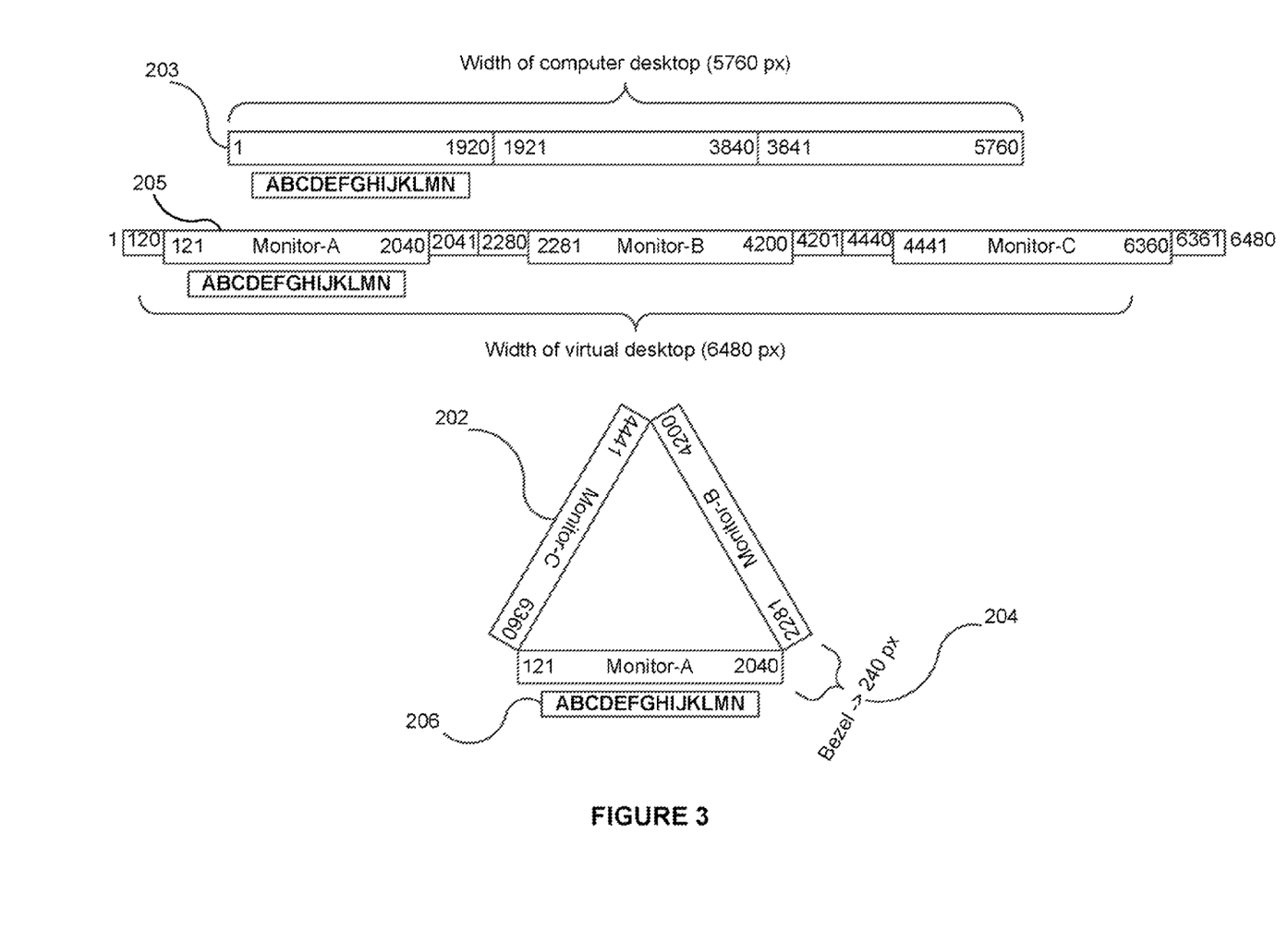
FIG. 3 illustrates a circular desktop system which includes three monitors in a closed-path configuration, in accordance with an embodiment.

FIG. 3 illustrates a circular desktop system which includes three monitors in a closed-path configuration (202), in accordance with an embodiment. In the example shown in FIG. 3, the three monitors, each having a width of 1920 pixels, are connected to a computer. The computer can render a computer desktop (203) which is (3×1920=5760) pixels wide, and having left and right extents or borders. Since each monitor includes a bezel (204)—in this example corresponding to a 240 pixel area between each monitor—then the width of the virtual desktop can be larger by (3×240=720) pixels, i.e., a total of (5760+720=6480) pixels wide (205). FIG. 3 also illustrates an object, in this example a graphical element "ABCDEFGHIJKLMNOPQRSTUVWXYZ", as it would be rendered (206) in each of the various views of the system, i.e., on the circular-mounted monitors (202), on the virtual version of the desktop (205), and on each of the monitors (203) as rendered directly by the computer.

Figure 4:
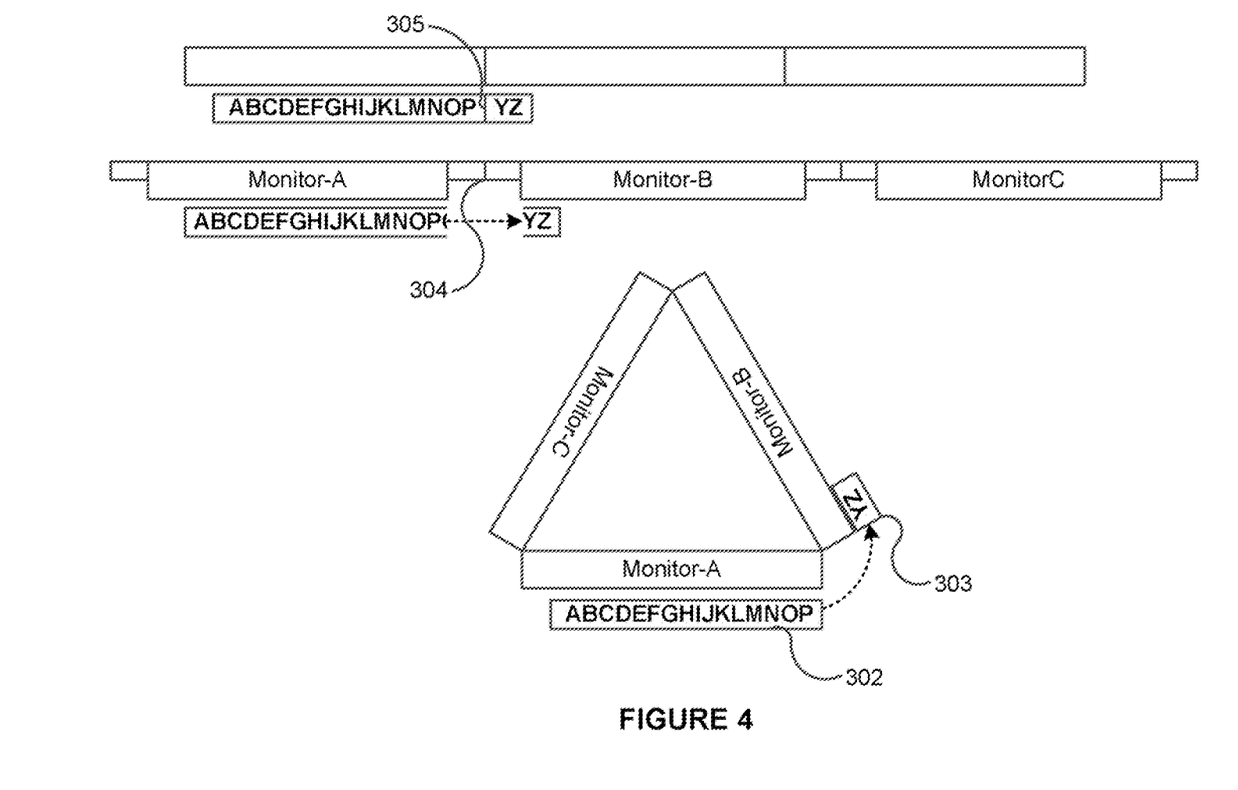
FIG. 4 further illustrates the use of a three monitor closed-path configuration, in accordance with an embodiment, showing how the monitor bezel impacts the rendering of objects.

FIG. 4 further illustrates the use of a three monitor closed-path configuration, in accordance with an embodiment, showing how the monitor bezel impacts the rendering of objects.

As shown in FIG. 4, in this example, a user has moved the object to the right (302) on the desktop. By moving the object beyond the right side of Monitor-A, the object will start to appear on the left side of Monitor-B (303). In the example shown in FIG. 4, the portion of the object corresponding to "QRSTUVWX" is not rendered, since that portion corresponds to the width of the bezel (304). As shown in the view as rendered directly by the computer (305), the adjustments to the object, including accounting for the bezels, are automatically made by the computer when it renders the object.

Figure 5:
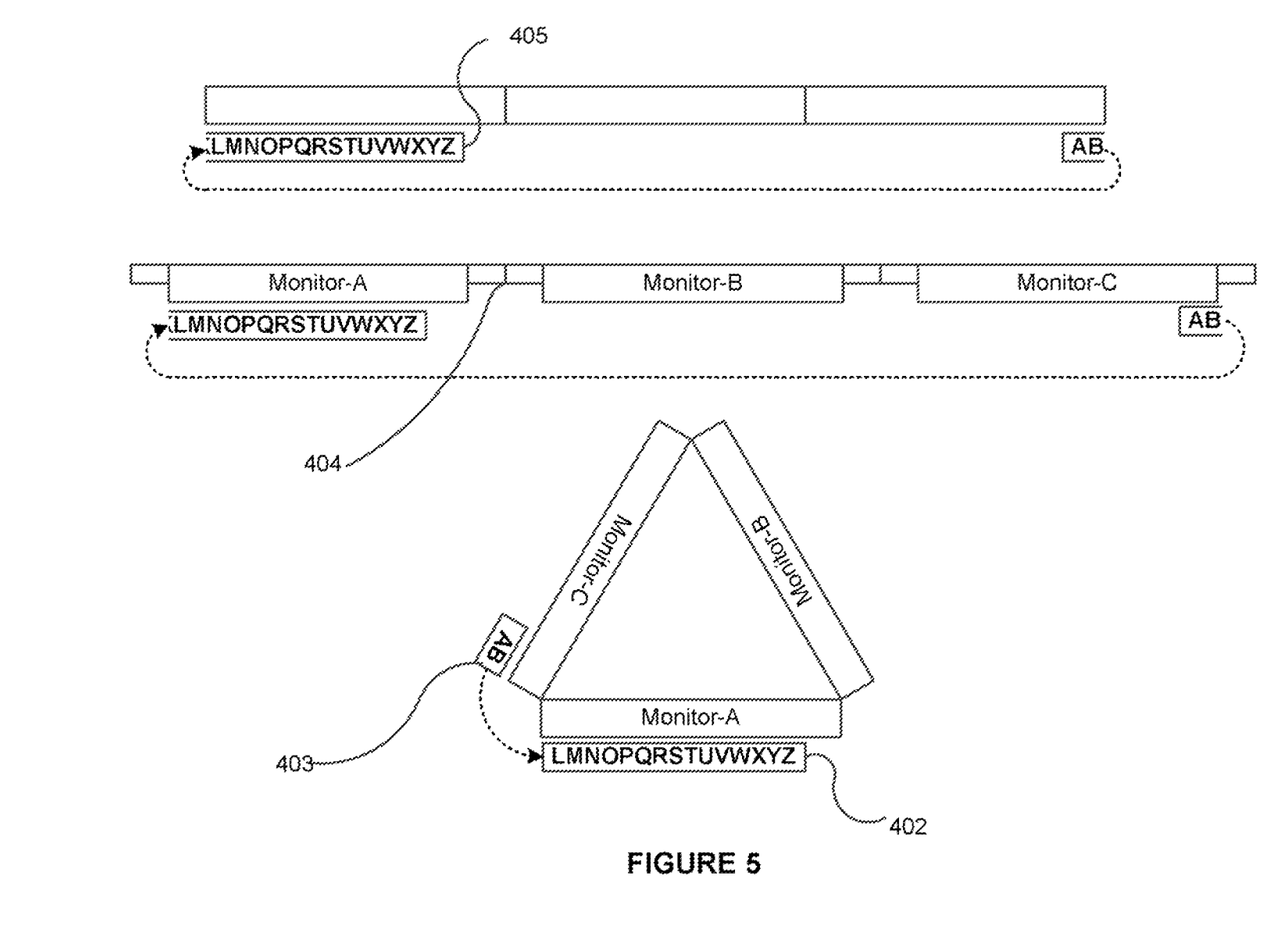
FIG. 5 further illustrates the use of a three monitor closed-path configuration, in accordance with an embodiment, showing how an object can be moved outside the computer monitor's physical left border, and rendered in a circular manner by accommodating a lack of natural left and right desktop boundaries in the physical layout of the monitors.

FIG. 5 further illustrates the use of a three monitor closed-path configuration, in accordance with an embodiment, showing how an object can be moved outside the computer monitor's physical left border, and rendered in a circular manner by accommodating a lack of natural left and right desktop boundaries in the physical layout of the monitors.

As shown in FIG. 5, in this example, a user has moved the object to the left (402). By moving the object beyond the left side of Monitor-A, the object will start to appear on the right side of Monitor-C (403). In the example shown in FIG. 5, the portion of the object corresponding to "CDEFHIJK" is not rendered, since that portion corresponds to the width of the bezel (404). As shown in the view as rendered directly by the computer (405), the adjustments to the object, including accounting for the bezels, are automatically made by the computer when it renders the object. It will also be seen that, in this example, two different portions of the object are rendered at the same time—including a first portion of the object to the left side of the desktop, and a second portion of the object to the right side.

Figure 6:
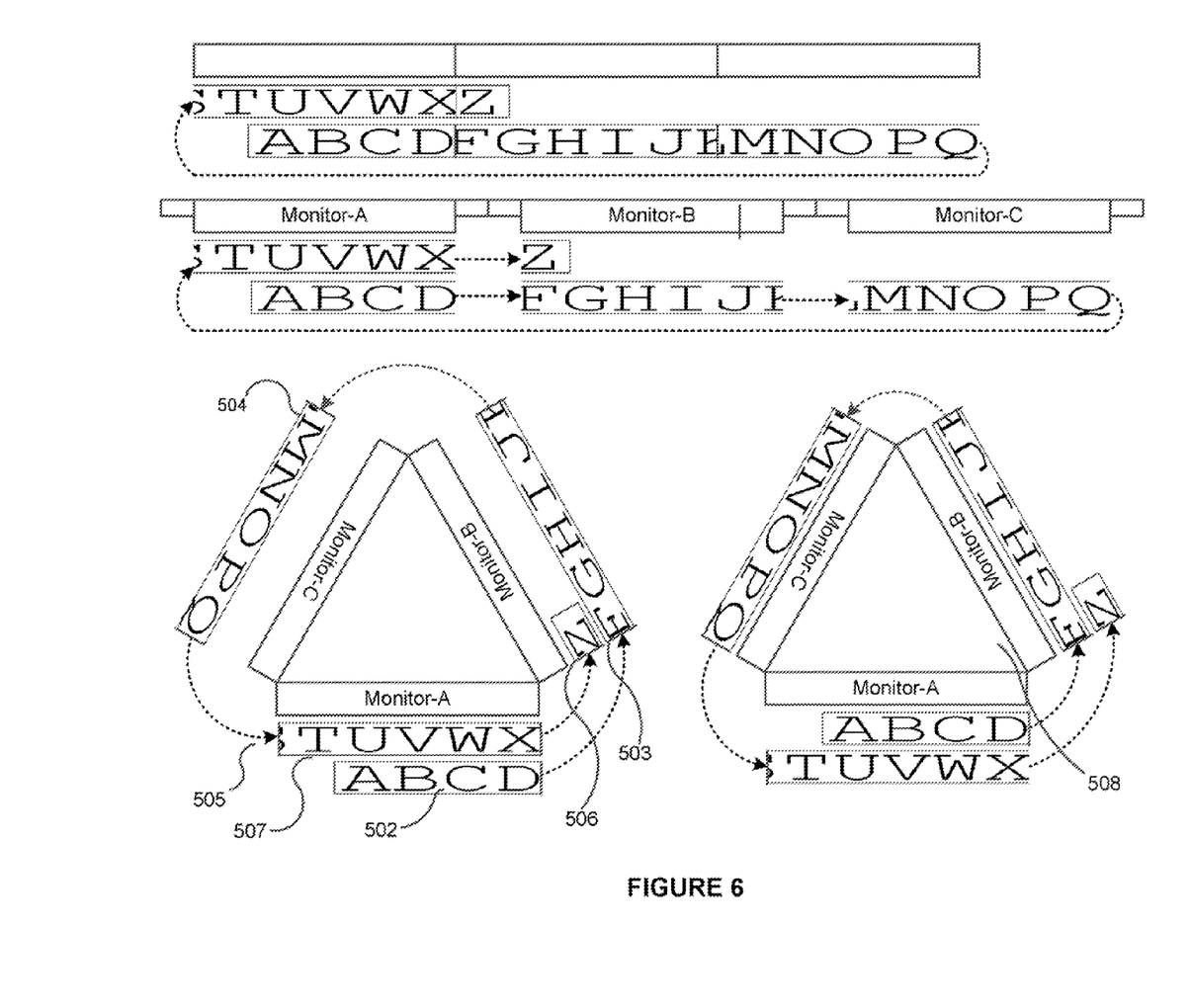
FIG. 6 further illustrates the use of a three monitor closed-path configuration, in accordance with an embodiment, showing how an object can be resized to an extent wider than the width of the desktop, so that the object wraps beneath itself, or alternatively above itself, in layers.

FIG. 6 further illustrates the use of a three monitor closed-path configuration, in accordance with an embodiment, showing how an object can be resized to an extent wider than the width of the desktop, so that the object wraps beneath itself, or alternatively above itself, in layers.

As shown in FIG. 6, in this example, a user has resized the object by extending the object's right side while keeping the left side of the object fixed in position (502). In accordance with an embodiment, the act of resizing will eventually cause the system to start to render the right side of the object on Monitor-B (503). If the user continues to extend the width, the rendering will continue on to Monitor-C (504), and then ultimately back on to Monitor-A (505). On Monitor-A such a resize would eventually make the right side of the object meet the left side of the same object. In accordance with an embodiment, the system can be configured so that, when this is detected the right side of the object is pushed under its left side (502). Eventually such a resize may continue into Monitor-B (506); however this portion of the object will be hidden by the top layer of the same object. In accordance with an embodiment, after the resize the user can click or activate the portion of the object (507) that is layered below the front layer (502), which will cause that layer to move to the top or most visible layer, as shown (508).

FIGS. 7-11 illustrate respectively a system which includes two or more, three, four, a plurality (in this example, eight) monitors, or a single cylindrical monitor, in a closed-path configuration and distributed on the surface of a column or another type of support structure, in accordance with various embodiments. Each of the examples illustrated in FIGS. 7-11 show how a closed-path monitor system (i.e., a circular desktop) can appear when the monitors are located on the outside of the closed-path.

Figure 7:
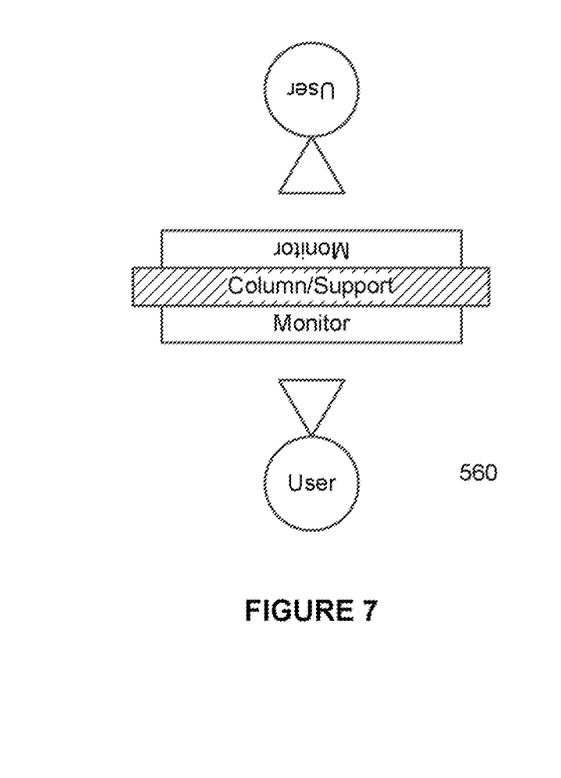
FIG. 7 illustrates a system which includes two or more monitors in a closed-path configuration and distributed on the surface of a column or another type of support structure, in accordance with an embodiment.

For example, in FIG. 7, two monitors 560 can be placed on a column or support with their backs to each other. If a first user, accessing a first monitor, is moving an object to their left, then that object will appear on the second monitor from the second users' right side. Similarly, if the first user, accessing the first monitor, is moving an object to their right, then that object will appear on the second monitor from the second users' left side.

Figure 8:
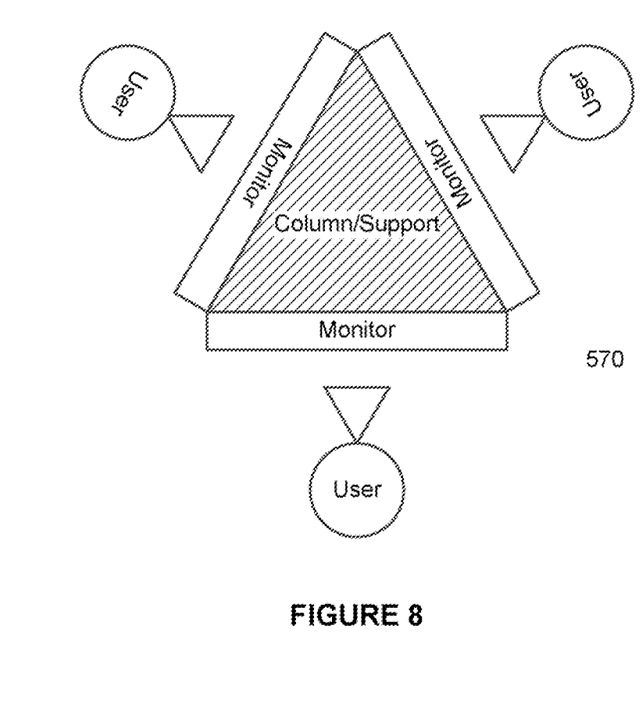
FIG. 8 illustrates a system which includes three monitors distributed on the surface of a column or support structure, in accordance with another embodiment.
Figure 9:
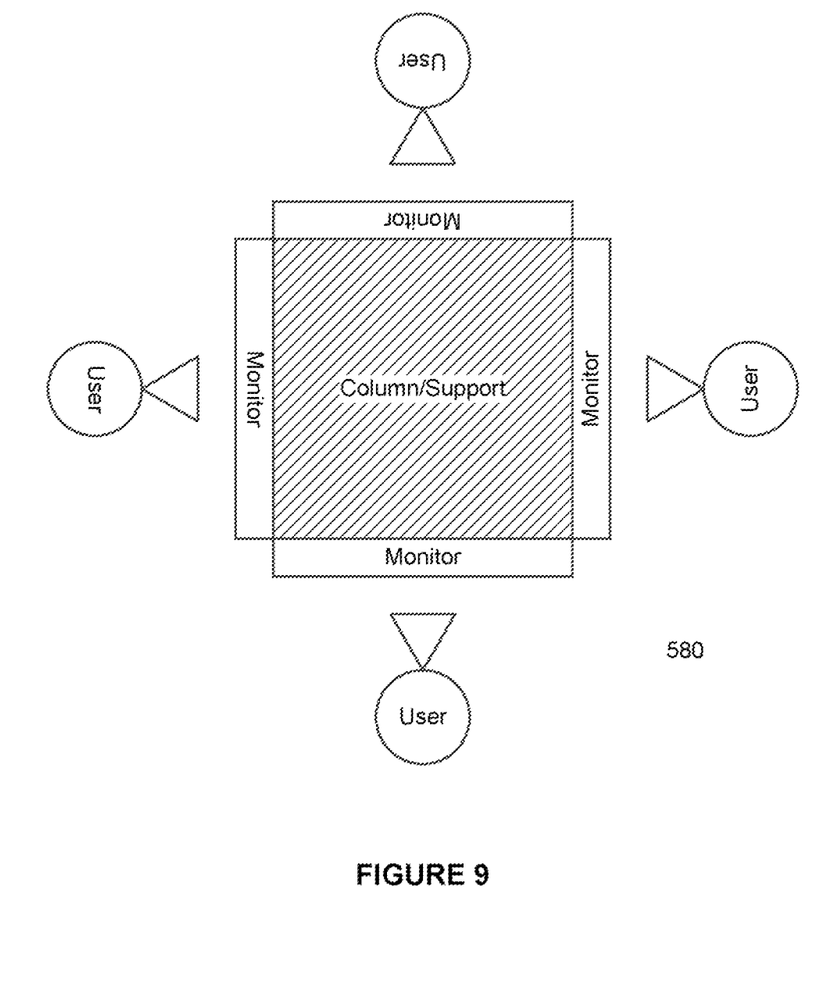
FIG. 9 illustrates a system which includes four monitors distributed on the surface of a column or support structure, in accordance with another embodiment.
Figure 10:
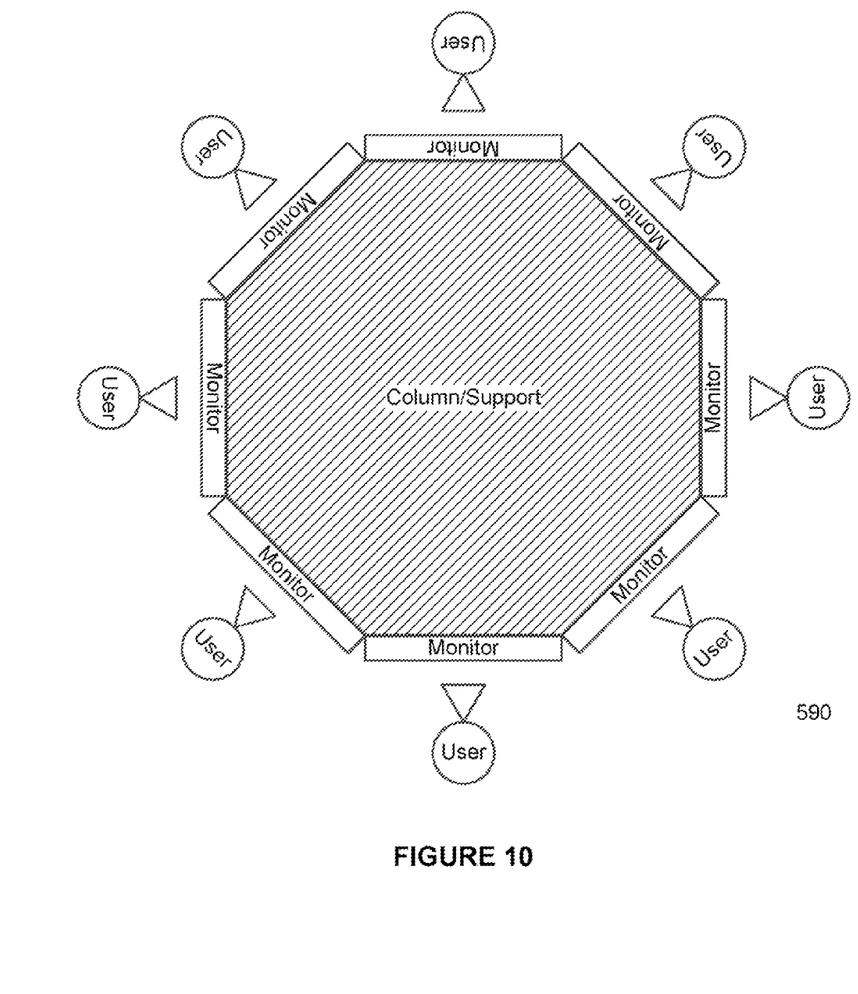
FIG. 10 illustrates a system which includes a plurality (in this example, eight) monitors distributed on the surface of a column or support structure, in accordance with another embodiment.
Figure 11:
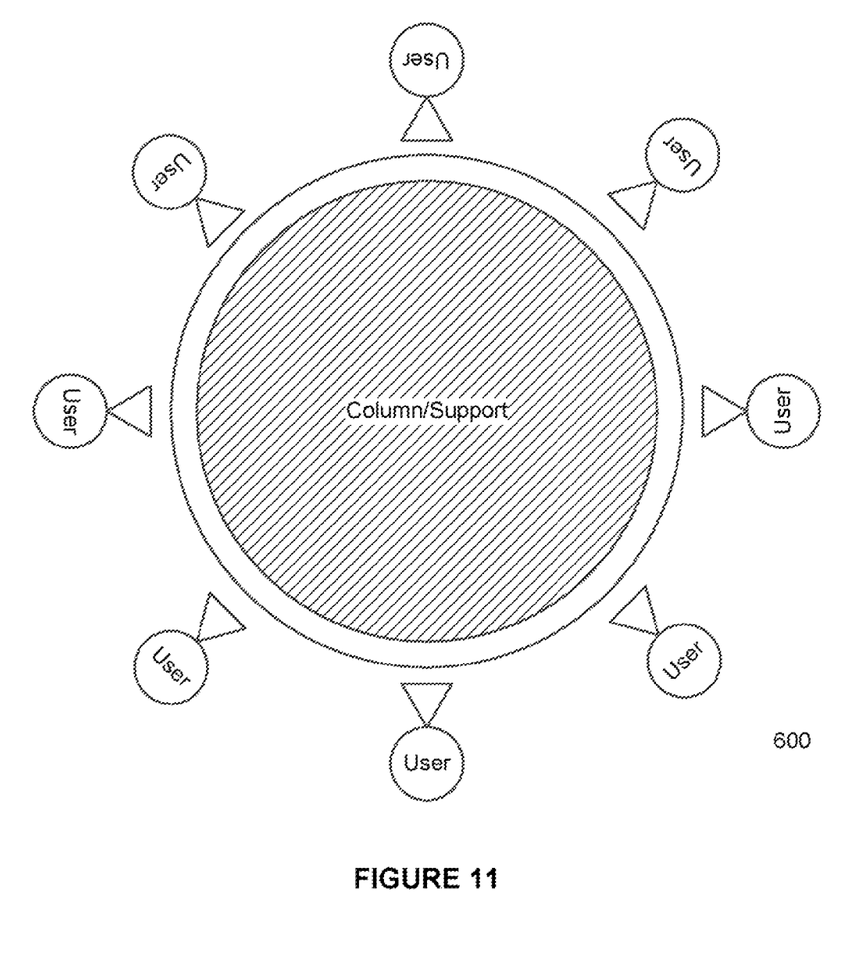
FIG. 11 illustrates a system which includes a single cylindrical monitor distributed on the surface of a column or support structure, in accordance with another embodiment.

FIGS. 8-10 illustrate similar examples 570, 580, 590, with different numbers of monitors; while FIG. 11 illustrates an example using a cylindrical monitor 600 with a single cohesive surface having no bezel breaking up the horizontal path. The circular desktop system and method can be applied equally to each of these illustrations. Bezel adjustments can be made between each of the monitors in the system depending on the particular dimensions of that monitor. In the case of a single, e.g. cylindrical monitor, virtual bezels can be displayed and accommodated, if the desire is to present individual users with their own "monitor space".

Figure 12:
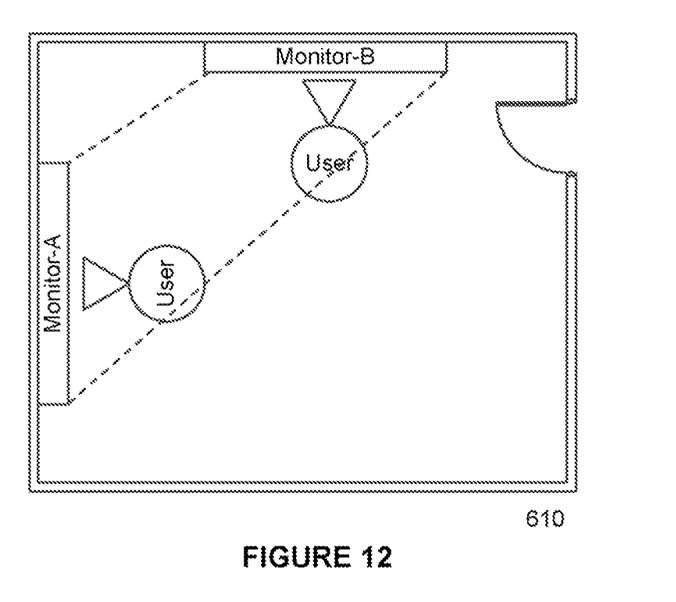
FIG. 12 illustrates the use of two monitors located at a distance from each other in a closed-path configuration, in accordance with an embodiment.
Figure 13:
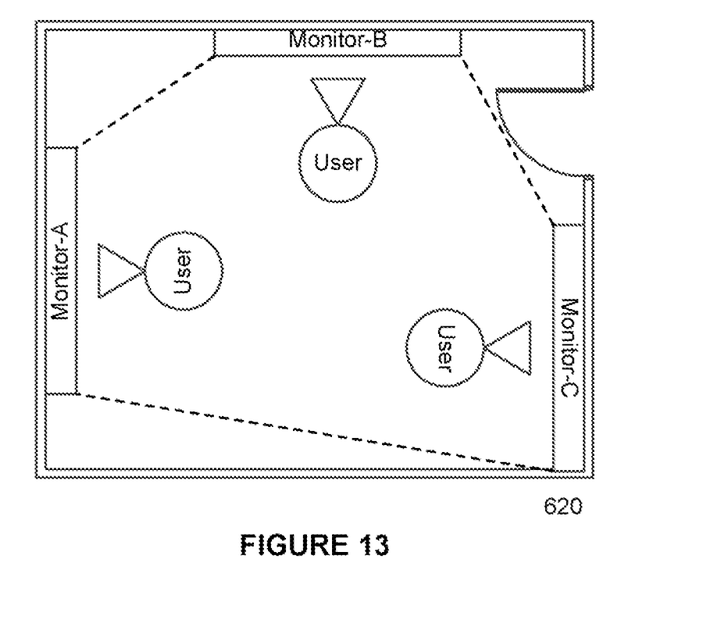
FIG. 13 illustrates the use of three monitors located at a distance from each other in a closed-path configuration, in accordance with another embodiment.
Figure 14:
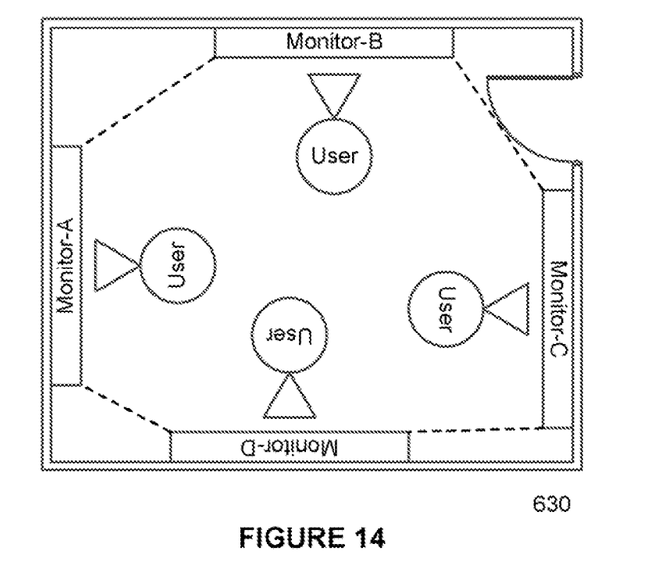
FIG. 14 illustrates the use of a plurality (in this example, four) monitors located at a distance from each other in a closed-path configuration, in accordance with an embodiment.

FIGS. 12-14 illustrate respectively the use of two, three, or a plurality (in this example, four) monitors located at a distance from each other in a closed-path configuration, in accordance with various embodiments. In the examples 610, 620, 630 shown, monitors are located on the inside of the closed-path, indicated by the dotted line.

For example, in FIG. 12, two monitors can be placed on different walls. If a first user, accessing a first monitor, is moving an object to their left, then that object will appear on the second monitor from the second users' right side. Similarly, if the first user, accessing the first monitor, is moving an object to their right, then that object will appear on the second monitor from the second users' left side.

FIGS. 13-14 illustrate similar examples, with different numbers of monitors. The circular desktop system and method can be applied equally to each of these situations, and, as above, bezel adjustments can be made between each of the monitors in the system depending on the particular dimensions of that monitor.

In accordance with various embodiments, in addition to supporting the circular desktop user-computer interaction features described above, embodiments of the system can also incorporate or otherwise support use of additional user-computer interaction features, such as those described in U.S. patent application titled "SYSTEM AND METHOD FOR ENABLING A COLLABORATIVE DESKTOP ENVIRONMENT", application Ser. No. 13/213,025, filed Aug. 18, 2011, and published as U.S. Publication No. 20120054640; which application is herein incorporated by reference.

Figure 15:
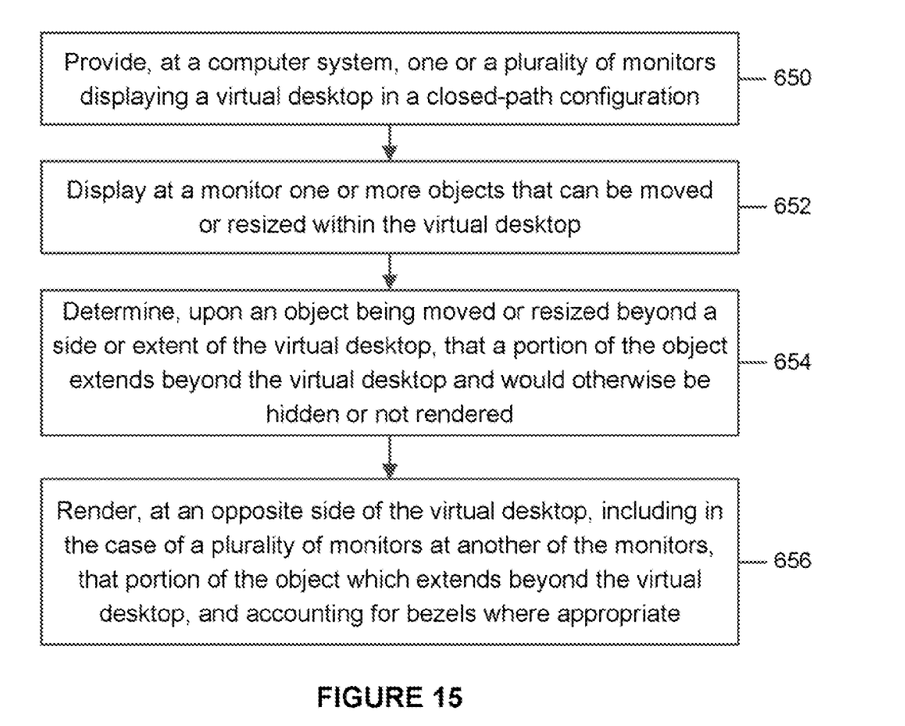
FIG. 15 is a flowchart that illustrates a method of providing a circular computer desktop, in accordance with an embodiment.

FIG. 15 is a flowchart that illustrates a method of providing a circular computer desktop, in accordance with an embodiment. As shown in FIG. 15, in accordance with an embodiment, at a step 650, a system including one or a plurality of monitors displaying a virtual desktop in a closed-path configuration is provided. At a next step 652, the system displays at a monitor one or more objects that can be moved or resized within the virtual desktop. At a next step 654, the system determines, upon an object being moved or resized beyond a side or extent of the virtual desktop, that a portion of the object extends beyond the virtual desktop and would otherwise be hidden or not rendered. At a next step 656, the system renders, at an opposite side of the virtual desktop, including in the case of a plurality of monitors at another of the monitors, that portion of the object which extends beyond the virtual desktop, and accounting for bezels where appropriate, such that the effect can be one of a continuous or circular desktop.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. For example, although many of the foregoing examples describe a circular desktop with left/right sides or extents, similar functionality can be used with a circular desktop with top/bottom sides extents, or with both left/right and top/bottom sides or extents. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing a circular computer desktop environment, comprising:

a computer system, including one or more processors and
  a circular desktop logic, the circular desktop logic providing for a logical desktop that extends beyond a viewable desktop screen; and
at least one monitor operable with the computer system and displaying a virtual desktop in a closed-path configuration,
the virtual desktop displays at least one object that can be moved or resized within the desktop, and upon an object being moved or resized beyond an extent of the virtual desktop's viewable desktop, a portion of the object which extends beyond the virtual desktop and would otherwise be hidden or not rendered is rendered at an opposite side of the virtual desktop's viewable desktop and wraps beneath/above a portion of the object that remains on the virtual desktop's viewable desktop.

2. The system of claim 1, wherein the virtual desktop has left and right extents and/or top and bottom extents, and wherein upon the object being moved or resized beyond any extent, the portion of the object which extends beyond that extent is rendered at the opposite side of the virtual desktop.

3. The system of claim 1, wherein the virtual desktop has both left and right extents, and top and bottom extents.

4. The system of claim 1, wherein the system accounts for bezels where appropriate, including upon the object being moved or resized beyond an extent of the virtual desktop, the portion of the object which is ultimately rendered at the opposite side of the virtual desktop, is that portion that would otherwise be hidden or not rendered less the width of one or more bezels.

5. The system of claim 1, wherein upon the object being moved or resized beyond an extent of the virtual desktop, the object is layered.

6. The system of claim 5, wherein the system includes a plurality of monitors distributed around a column or support and wherein the virtual desktop is distributed over the plurality of monitors.

7. The system of claim 5, wherein the system includes a plurality of monitors located a distance from each other and wherein the virtual desktop is distributed over the plurality of monitors.

8. A method for providing a circular computer desktop environment, comprising:
displaying, at one or more monitors, a virtual desktop in a closed-path configuration, the circular computer desktop environment provides for a logical desktop that extends beyond a viewable desktop screen;
the virtual desktop displays at least one object that can be moved or resized within the desktop, and
upon an object being moved or resized beyond an extent of the virtual desktop's viewable desktop, a portion of the object which extends beyond the virtual desktop and would otherwise be hidden or not rendered is rendered at an opposite side of the virtual desktop's viewable desktop and wraps beneath/above a portion of the object that remains on the virtual desktop's viewable desktop.

9. The method of claim 8, wherein the virtual desktop has left and right extents and/or top and bottom extents, and wherein upon the object being moved or resized beyond any extent, the portion of the object which extends beyond that extent is rendered at the opposite side of the virtual desktop.

10. The method of claim 8, wherein the virtual desktop has both left and right extents, and top and bottom extents.

11. The method of claim 8, wherein the method accounts for bezels where appropriate, including upon the object being moved or resized beyond an extent of the virtual desktop, the portion of the object which is ultimately rendered at the opposite side of the virtual desktop, is that portion that would otherwise be hidden or not rendered less the width of one or more bezels.

12. The method of claim 8, wherein upon the object being moved or resized beyond an extent of the virtual desktop, the object is layered.

13. The method of claim 12, wherein the system includes a plurality of monitors distributed around a column or support and wherein the virtual desktop is distributed over the plurality of monitors.

14. The method of claim 12, wherein the system includes a plurality of monitors located a distance from each other and wherein the virtual desktop is distributed over the plurality of monitors.

15. A non-transitory computer readable medium, including instructions stored thereon which when read and executed by at least one computer cause the computers to perform the acts comprising:
displaying, at least one monitor, a virtual desktop in a closed-path configuration,
implementing a desktop logic that provides for a logical desktop that extends beyond a viewable desktop screen;
the virtual desktop displays at least one object that can be moved or resized within the desktop, and
upon an object being moved or resized beyond an extent of the virtual desktop's viewable desktop, a portion of the object which extends beyond the virtual desktop and would otherwise be hidden or not rendered is rendered at an opposite side of the virtual desktop's viewable desktop and wraps beneath/above a portion of the object that remains on the virtual desktop's viewable desktop.

16. A system providing a circular computer desktop environment, comprising:
a computer system, including one or more processors and a circular desktop logic, the circular desktop logic providing for a logical desktop that extends beyond a viewable desktop screen; and
a plurality of monitors operable with the computer system and displaying a virtual desktop in a closed-path concave configuration, such that the viewable area of each monitor faces into the concave portion,
the virtual desktop displays at least one object that can be moved or resized within the desktop, and
upon an object being moved or resized beyond an extent of the virtual desktop's viewable desktop, a portion of the object which extends beyond the virtual desktop and would otherwise be hidden or not rendered is rendered at an opposite side of the virtual desktop's viewable desktop and wraps beneath/above a portion of the object that remains on the virtual desktop's viewable desktop.

* * * * *